Patented Mar. 3, 1931

1,794,453

UNITED STATES PATENT OFFICE

GEORGE D. GRAVES, OF WILMINGTON, DELAWARE, ASSIGNOR TO E. I. DU PONT DE NEMOURS & COMPANY, OF WILMINGTON, DELAWARE, A CORPORATION OF DELAWARE

REDUCTION OF FURFURAL TO TETRAHYDROFURFURYL ALCOHOL

No Drawing. Application filed October 12, 1928. Serial No. 312,217.

This invention relates to the art of producing alcohols, and more particularly to the reduction of furfural to tetrahydrofurfuryl alcohol.

It has previously been proposed to hydrogenate furfural to tetrahydrofurfuryl alcohol by the use of platinum activated with iron but platinum is expensive, the yield is not good, and appreciable quantities of solvent, such as ethyl alcohol, have been previously thought to be necessary.

I have discovered that by using a nickel catalyst the reduction can be caused to take place in the presence of a very small quantity of water with a much greater yield and without leaving any of the furfural unchanged.

It is therefore an object of this invention to effect the reduction of furfural to tetrahydrofurfuryl alcohol with the use of an inexpensive catalyst.

It is another object of this invention to effect the reduction with considerably higher yields.

It is also an object of this invention to increase the output of tetrahydrofurfuryl alcohol with any given equipment.

With the above and other objects in view, which will be apparent as the description proceeds, I have set forth my invention in the following specification and have included the following specific example by way of illustration and not as a limitation.

A mixture of 200 grams of freshly distilled furfural with 30 grams of water was shaken in the presence of hydrogen with 15 grams of a catalyst, made by the partial reduction of nickel chromate, which had been compressed into small pellets. The reduction started at 50° C., became faster at 100° C., and was continued for 30 minutes at a maximum of 140° C. After four to five hours hydrogenation was complete. The hydrogen pressure was initially 1800 pounds per square inch but dropped as absorption took place. More hydrogen was added from time to time to replace that absorbed, the pressure during the operation varying from 100 to 1800 pounds per square inch. A similar result could have been obtained, however, by maintaining communication between the reaction tube and the source of compressed hydrogen, in which case the pressure would have been substantially constant throughout the reaction. The catalyst was filtered from the mixture in the reaction tube and the filtrate was fractionally distilled. It contained neither furfural nor furfuryl alcohol. The yield of tetrahydrofurfuryl alcohol was 69.5%. The remainder of the furfural was converted to higher boiling products.

The nickel catalyst used in the above reaction may be prepared in the following manner. A solution containing one mol of nickel nitrate dissolved in two liters of water is heated to boiling and treated with a solution containing an equimolecular quantity of ammonium bichromate. Ammonium hydroxide is added with stirring until the mixture reacts slightly alkaline. The brick red precipitate of nickel chromate is filtered, thoroughly washed, dried, and partially reduced with hydrogen at 500–550° C. The reduced catalyst contains about 40% of elementary nickel and possesses a high activity toward the liquid phase hydrogenation of furfural.

Other nickel catalysts, such as those obtained by the reduction of precipitated nickel hydroxide and precipitated nickel carbonate, may be substituted for the nickel chromate.

Although I have used 15% of water, a hydrogen pressure of from 100 to 1800 pounds per square inch and temperatures of from 50–140° C., as indicated in the above example, I have also found that, when using an active catalyst, such as the one disclosed in detail herein, the water may be varied from 5–50%, the hydrogen pressure from approximately 100 to 1800 pounds per square inch, and the temperature of heating from 50–150° C.

It is a special feature of my invention that I am enabled to effect the reduction of furfural to tetrahydrofurfuryl alcohol without the use of any appreciable quantity of diluent or solvent, thus increasing the output of tetrahydrofurfuryl alcohol with equipment of any given size, and also effecting a considerable saving in cost on account of the evaporation and recovery of solvents when these are used.

No claim is made herein to the method of producing the reduced nickel catalyst set forth above inasmuch as I am not the inventor of this method.

As many apparently widely different embodiments of this invention may be made without departing from the spirit and scope thereof, it is to be understood that I do not limit myself to the specific embodiments thereof except as defined in the appended patent claims.

I claim:

1. The method of producing tetrahydrofurfuryl alcohol which comprises heating furfural under pressure in the presence of hydrogen, a nickel catalyst and water.

2. The method of claim 1 in which the heatis carried out at a temperature of above 50° C.

3. The method of producing tetrahydrofurfuryl alcohol which comprises heating furfural at a temperature between 50° and 150° C. under pressure in the presence of hydrogen, a nickel catalyst and water.

4. The method of claim 3 in which the reaction is carried out at pressures of at least 100 pounds per square inch.

5. The method of claim 1 in which the reaction is carried out in the presence of less than 50% of water.

6. The method of claim 1 in which the reaction is carried out in the presence of from 5-15% of water.

7. The method of claim 3 in which the catalyst is partially reduced nickel chromate.

8. The method of hydrogenating furfural into tetrahydrofurfuryl alcohol which comprises heating furfural under a hydrogen pressure of at least 100 pounds per square inch, in the presence of nickel reduced from nickel chromate, to a temperature of from 50-150° C. and in the presence of from 5-15% of water.

9. The liquid phase method of producing tetrahydrofurfuryl alcohol which comprises heating furfural under pressure in the presence of hydrogen, a nickel catalyst and water.

In testimony whereof, I affix my signature.

GEORGE D. GRAVES.

producing the reduced nickel catalyst set forth above inasmuch as I am not the inventor of this method.

As many apparently widely different embodiments of this invention may be made without departing from the spirit and scope thereof, it is to be understood that I do not limit myself to the specific embodiments thereof except as defined in the appended patent claims.

I claim:

1. The method of producing tetrahydrofurfuryl alcohol which comprises heating furfural under pressure in the presence of hydrogen, a nickel catalyst and water.

2. The method of claim 1 in which the heat is carried out at a temperature of above 50° C.

3. The method of producing tetrahydrofurfuryl alcohol which comprises heating furfural at a temperature between 50° and 150° C. under pressure in the presence of hydrogen, a nickel catalyst and water.

4. The method of claim 3 in which the reaction is carried out at pressures of at least 100 pounds per square inch.

5. The method of claim 1 in which the reaction is carried out in the presence of less than 50% of water.

6. The method of claim 1 in which the reaction is carried out in the presence of from 5-15% of water.

7. The method of claim 3 in which the catalyst is partially reduced nickel chromate.

8. The method of hydrogenating furfural into tetrahydrofurfuryl alcohol which comprises heating furfural under a hydrogen pressure of at least 100 pounds per square inch, in the presence of nickel reduced from nickel chromate, to a temperature of from 50-150° C. and in the presence of from 5-15% of water.

9. The liquid phase method of producing tetrahydrofurfuryl alcohol which comprises heating furfural under pressure in the presence of hydrogen, a nickel catalyst and water.

In testimony whereof, I affix my signature.

GEORGE D. GRAVES.

DISCLAIMER 1,794,453.—*George D. Graves*, Wilmington, Del. REDUCTION OF FURFURAL TO TETRAHYDROFURFURYL ALCOHOL. Patent dated March 3, 1931. Disclaimer fi ed July 1, 1933, by the assignee, *E. I. du Pont de Nemours & Company*.

Hereby enters this disclaimer to that part of said specification and claims which is in the following words, to wit:

"1. The method of producing tetrahydrofurfuryl alcohol which comprises heating furfural under pressure in the presence of hydrogen, a nickel catalyst and water.

"2. The method of claim 1 in which the heat is carried out at a temperature of above 50° C.

"3. The method of producing tetrahydrofurfuryl alcohol which comprises heating furfural at a temperature between 50 and 150° C. under pressure in the presence of hydrogen, a nickel catalyst and water.

"4. The method of claim 3 in which the reaction is carried out at pressures of at least 100 pounds per square inch."

"9. The liquid phase method of producing tetrahydrofurfuryl alcohol which comprises heating furfural under pressure in the presence of hydrogen, a nickel catalyst and water."

DISCLAIMER 1,794,453.—*George D. Graves*, Wilmington, Del. REDUCTION OF FURFURAL TO TETRAHYDROFURFURYL ALCOHOL. Patent dated March 3, 1931. Disclaimer filed March 31, 1934, by the assignee, *E. I. du Pont de Nemours & Company*.

Hereby enters this disclaimer to that part of said specification and claims which is in the following words, to wit:

"7. The method of claim 3 in which the catalyst is partially reduced nickel chromate.

"8. The method of hydrogenating furfural into tetrahydrofurfuryl alcohol which comprises heating furfural under a hydrogen pressure of at least 100 pounds per square inch, in the presence of nickel reduced from nickel chromate to a temperature of from 50–150° C. and in the presence of from 5–15% of water."

[*Official Gazette April 24, 1934.*]

DISCLAIMER 1,794,453.—*George D. Graves*, Wilmington, Del. REDUCTION OF FURFURAL TO TETRAHYDROFURFURYL ALCOHOL. Patent dated March 3, 1931. Disclaimer filed March 31, 1934, by the assignee, *E. I. du Pont de Nemours & Company*.

Hereby enters this disclaimer to that part of said specification and claims which is in the following words, to wit:

"7. The method of claim 3 in which the catalyst is partially reduced nickel chromate.

"8. The method of hydrogenating furfural into tetrahydrofurfuryl alcohol which comprises heating furfural under a hydrogen pressure of at least 100 pounds per square inch, in the presence of nickel reduced from nickel chromate to a temperature of from 50–150° C. and in the presence of from 5–15% of water."

[*Official Gazette April 24, 1934.*]